(12) United States Patent
Papi et al.

(10) Patent No.: US 12,012,122 B1
(45) Date of Patent: Jun. 18, 2024

(54) OBJECT ORIENTATION ESTIMATOR

(71) Applicant: Zoox, Inc., Foster City, CA (US)

(72) Inventors: Francesco Papi, Sunnyvale, CA (US);
Qian Song, San Mateo, CA (US);
Stanley Lilian Volta, Mountain View, CA (US); Allan Zelener, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 274 days.

(21) Appl. No.: 17/716,391

(22) Filed: Apr. 8, 2022

(51) Int. Cl.
| | |
|---|---|
| *B60W 60/00* | (2020.01) |
| *B60W 30/09* | (2012.01) |
| *B60W 30/095* | (2012.01) |
| *B60W 40/04* | (2006.01) |
| *B60W 50/00* | (2006.01) |
| *G06N 5/04* | (2023.01) |

(52) U.S. Cl.
CPC ........ *B60W 60/0011* (2020.02); *B60W 30/09* (2013.01); *B60W 30/0956* (2013.01); *B60W 40/04* (2013.01); *B60W 50/0097* (2013.01); *B60W 60/0015* (2020.02); *B60W 60/00274* (2020.02); *G06N 5/04* (2013.01); *B60W 2554/4041* (2020.02); *B60W 2554/4044* (2020.02); *B60W 2554/80* (2020.02)

(58) Field of Classification Search
CPC ........ B60W 60/0011; B60W 60/0015; B60W 60/00274; B60W 30/09; B60W 30/0956; B60W 40/04; B60W 50/0097; B60W 2554/4041; B60W 2554/4044; B60W 2554/80; G06N 5/04
See application file for complete search history.

(56) References Cited

U.S. PATENT DOCUMENTS

| | | | |
|---|---|---|---|
| 2019/0079526 A1* | 3/2019 | Vallespi-Gonzalez | G01S 7/417 |
| 2019/0322275 A1* | 10/2019 | Ondruska | G01C 21/3635 |
| 2021/0278864 A1* | 9/2021 | Beffa | G05D 1/106 |
| 2023/0041031 A1* | 2/2023 | Baldan | B60W 60/001 |
| 2023/0154030 A1* | 5/2023 | Molin | G06T 7/77 382/100 |

* cited by examiner

*Primary Examiner* — Michael J Zanelli
(74) *Attorney, Agent, or Firm* — EIP US LLP

(57) ABSTRACT

A computer implemented method. Includes: obtaining, from a sensor system onboard a vehicle, a plurality of hypotheses for an orientation of an object in a vicinity of the vehicle, relative to a coordinate system of the vehicle; estimating, based on the plurality of hypotheses, values of a probability distribution for the orientation of the object at a plurality of candidate orientations; and estimating, based at least in part on the estimated values of the probability distribution at the plurality of candidate orientations, the orientation of the object relative to the coordinate system.

20 Claims, 9 Drawing Sheets

OBJECT ORIENTATION ESTIMATOR

BACKGROUND

An autonomous vehicle typically includes sensors coupled to a data processing system capable of detecting objects in its vicinity, and estimating state variables associated with the detected objects, such as position, dimensions, orientation and velocity. By accurately estimating the orientation of a dynamic object such as a vehicle, the autonomous vehicle may be able to better predict the trajectory of the dynamic object, and to make better decisions in view of the predicted trajectory of the dynamic object.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
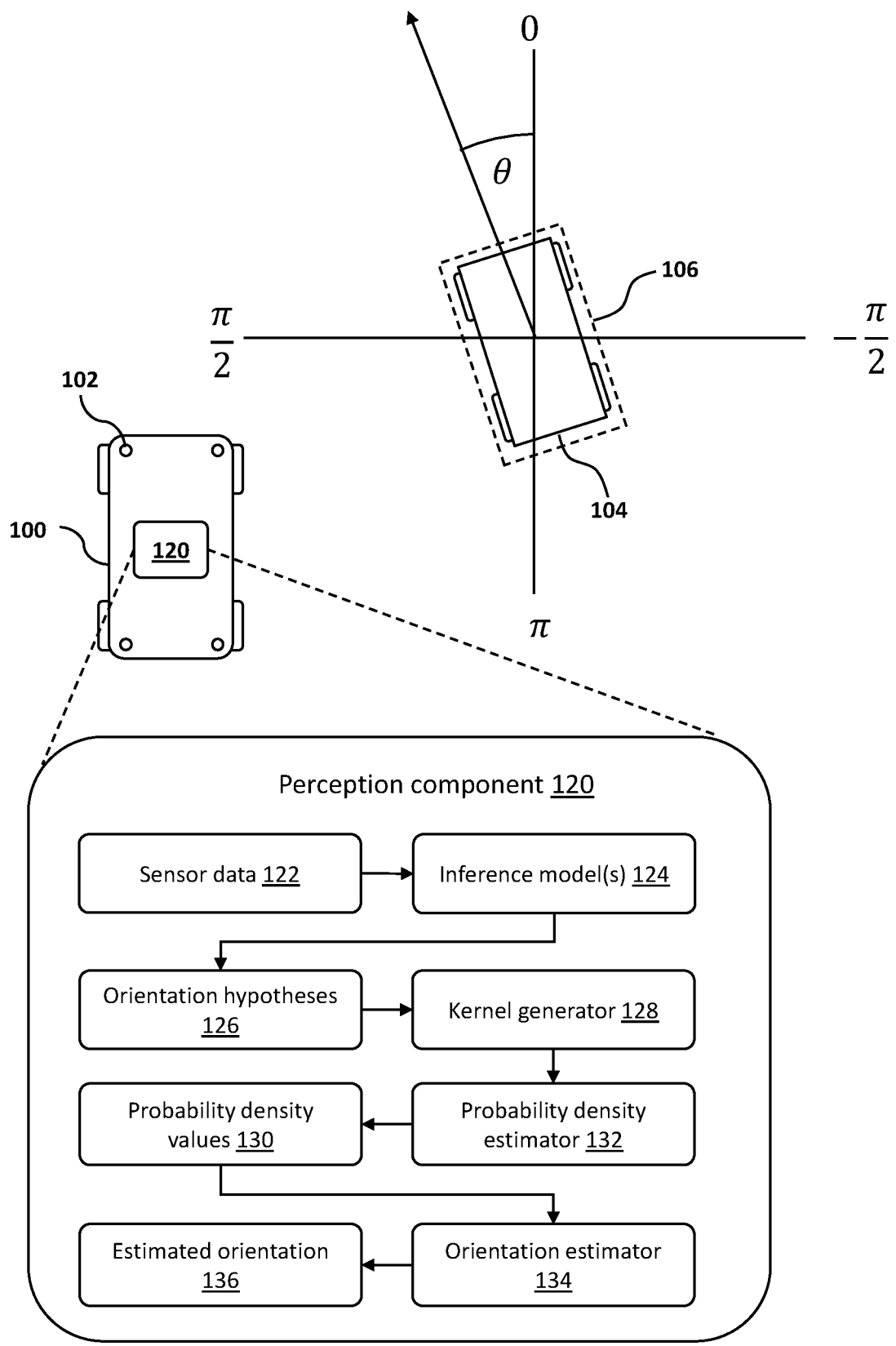
FIG. 1 is a schematic diagram of a system for estimating an orientation of an object in a vicinity of a vehicle.

The present disclosure relates to methods and systems for estimating orientations of objects, for example objects in a vicinity of an autonomous vehicle. An autonomous vehicle may include various sensors coupled to a perception component, for use in determining state variables associated with objects in the vicinity of the autonomous vehicle. State variables may include dynamic variables which are expected to vary over time, such as position, velocity, orientation and/or rotation rate relative to a coordinate system. State variables may further include static variables which are expected to remain constant over time, including geometric properties of the entity such as dimensions, extent, and/or shape of the object. By accurately and frequently estimating state variables associated with dynamic objects in its vicinity (such as other vehicles), an autonomous vehicle may be able to infer the trajectory and dimensions of the objects, enabling the autonomous vehicle to predict which regions of space will be occupied by the objects at future times, and to take actions according to these predictions. For example, by detecting a change of orientation of a dynamic object, the autonomous vehicle may determine that a dynamic object is changing direction towards the autonomous vehicle, and take evasive action if necessary.

In order to estimate the orientation of an object, the perception component of an autonomous vehicle may process data from one or more sensors, for example using one or more neural network models or other machine learning models, to generate multiple hypotheses for the orientation of the object. The model may further assign a confidence value to each generated hypothesis. The perception component has the task of determining a single estimate for the orientation of the object, based on the generated hypotheses. The orientation of the object may for example be estimated by selecting a most confident of the hypotheses for the orientation of the object. However, the resulting estimate may discard information contained within less confident hypotheses, which may lead to a lack of accuracy and robustness, particularly in cases where several hypotheses have comparable confidence scores. Alternatively, multiple hypotheses for the orientation can be combined, for example as a weighted average. In this case, the resulting estimates may be strongly affected by large errors in the hypotheses, which are frequently encountered in certain autonomous driving situations as will be explained in more detail hereinafter.

The present disclosure provides improved methods for estimating the orientation of an object, based on a set of hypotheses for the orientation of the object. The disclosed methods involve estimating values of a rotational probability density function at a set of candidate orientations, and using the estimated values of the rotational probability density function to estimate the orientation of the object. Advantageously, the methods can merge information from multiple hypotheses whilst remaining robust against large errors in the hypotheses.

To expand on the above, FIG. 1 shows a top-down view of an autonomous vehicle 100 with onboard sensors 102 coupled to a perception component 120. Various functions of the perception component 120 may be implemented using software, hardware, or a combination of both. The perception component 120 is configured to process sensor data 122 captured by the onboard sensors 102 to detect and classify objects in the vicinity of the autonomous vehicle 100, and to estimate state variables associated with the detected objects, including orientations of the objects relative to a coordinate system of the autonomous vehicle 100. In the present disclosure, a coordinate system of an autonomous vehicle may refer to coordinate system of a reference frame which has a fixed origin and orientation relative to the autonomous vehicle, irrespective of how the origin or orientation of the reference frame are arranged relative to the autonomous vehicle.

The orientation of an object may refer to a one-dimensional quantity representing a single Euler angle, for example an azimuthal yaw angle or a pitch or roll angle, or may be a multi-dimensional quantity representing multiple angles, for example two or three Euler angles.

Alternatively, the orientation may be defined using a rotation matrix, unit vector, or any other suitable representation. The orientation of an object may be defined as the orientation of a bounding box for the object (with one side of the bounding box defining a forward direction), where the bounding box may be defined as a rectangle or cuboid of minimum dimensions which fully contains the object (or a projection of the object in two dimensions, such as a top-down projection). By defining a bounding box in this way, an orientation can be defined even for an object with an irregular geometry. In the example of FIG. 1, orientation refers to the anticlockwise azimuthal (yaw) angle θ from a forward direction of the vehicle 102, measured in the interval $(-\pi, \pi]$, as indicated by the axes shown. In other examples, the yaw angle may be defined on a positive interval such as $[0, 2\pi)$, and/or on a reduced interval such as a semicircle $[0, \pi)$, in which case the yaw angle may be defined up to a reflection. In this example, a vehicle 104 is detected in the vicinity of the autonomous vehicle 102. The vehicle 104 has a rectangular bounding box 106, and the orientation (i.e. yaw angle) of the vehicle 104 relative to the coordinate system of the autonomous vehicle 102 (which may be equated to the orientation of the bounding box 106) is around 0.35 radians or 20°.

The perception component 120 can be configured to process the sensor data 122 using one or inference models 124 to determine hypotheses for state variables associated with the vehicle 104, including hypotheses 126 for the orientation of the vehicle 104 (or, more specifically, multiple hypotheses for the bounding box 106 for the vehicle 104, including the orientation of the bounding box 106). The inference model(s) 124 may further assign a confidence value to each generated hypothesis. The inference model(s) 124 may include one or more deep learning models and/or other machine learning models, and prior to deployment the inference model(s) 124 may be trained using training data in which the ground truth orientations of objects are provided. The inference model(s) 124 may be configured to process data obtained from a particular type of sensor such as LIDAR, camera, sonar, etc., or to process data derived from multiple different types of sensor (sometimes referred to as different sensor modalities). Different hypotheses may be generated by different models, different outputs of a same model, and/or from sensor data collected at different times. It is common for an inference model to generate multiple proposals or hypotheses for a given state variable associated with an object, for example based on region proposals, anchor boxes or similar. The inference model(s) 124 may for example generate per-pixel proposals, with different proposals/hypotheses resulting from pixels at different locations (e.g. image pixels or LIDAR pixels), optionally with confidence values associated with each per-pixel proposal/hypothesis. The inference model(s) 124 may further leverage information from previous estimates of state variables associated with an object. In particular, by tracking an individual object over time, a noise filter (such as a Kalman filter) may be applied recursively to filter out at least some sources of error in the sensor data 122.

Figure 2A:
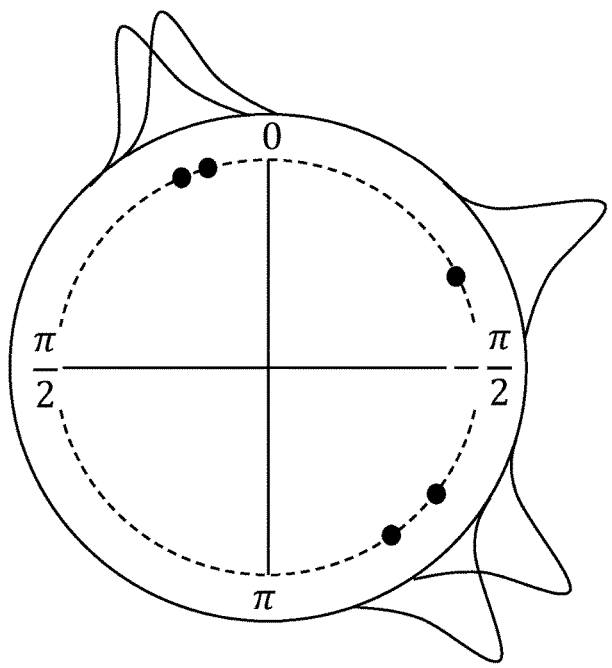
FIGS. 2A-2C illustrate methods of estimating a rotational probability density function in accordance with examples.

FIG. 2A shows five points on the unit circle (shown dashed) representing hypotheses for the orientation of the vehicle 104 (in reality the number of hypotheses may be much greater). It is observed that there are two hypotheses close to the correct orientation of 0.35 radians or 20°, as well as two hypotheses which are approximate rotations of the correct orientation by $\pi$ radians (i.e. reflections of the correct orientation about the origin), and a further hypothesis which is an approximate rotation of the correct orientation by $\pi/2$ radians.

Returning to FIG. 1, the perception component 120 has the task of determining a single estimate for the orientation of the vehicle 104, based on the generated hypotheses 126. In this example, the perception component 120 includes a kernel generator 128 configured to generate rotational kernels in dependence on the determined orientation hypotheses. A rotational kernel may be a probability density function defined on a rotational domain (i.e. a domain in which every point can be specified entirely using angles relative to a reference frame). Examples of rotational domains include for example a unit circular domain, a unit spherical domain, or a domain spanning the space of rotations in three dimensions. Although a kernel may be normalized so as to describe a probability density, this normalization is not essential in the present setting. A rotational kernel exhibits continuity throughout the rotational domain, including across branch planes such as $\theta=0$ in plane polar coordinates and $\phi=0$ in spherical planes coordinates. The density of the rotational kernel may be concentrated around a peak orientation and may decrease at orientations away from the peak orientation. A rotational kernel typically has one or more parameters indicating for example the peak orientation and an angular concentration or bandwidth of the kernel around from the peak density (bandwidth is analogous to standard deviation whereas concentration is analogous to the reciprocal of variance). Examples of rotational kernels are von Mises-Fisher kernels or wrapped normal kernels, which continuous and smooth on the rotational domain and have densities corresponding to the von Mises-Fisher distribution and the wrapped normal kernel respectively. The von Mises-Fisher distribution is defined for unit vectors x on the $(p-1)$ sphere $\mathbb{S}^{p-1} \subset \mathbb{R}^p$, and has a density given by $f_p(x; \mu, \kappa) = C_p(\kappa)\exp(\kappa \cdot \mu^T x)$, where $\mu$ is a unit vector parameter defining a mean direction (i.e. peak orientation), $\kappa$ is a scalar concentration parameter determining how concentrated the density of the kernel is about the mean direction, and $C_p = \kappa^{p/2-1}/[(2\pi)^{p/2} I_{p/2-1}(\kappa)]$ is a normalization factor, where $I_v$ represents the Bessel function of order v. For $p=2$, the von Mises-Fisher distribution is referred to as the von Mises distribution, which is defined on a circle and given in plane polar coordinates by $f_2(\theta; \mu, K) = 1/(2\pi I_0(\kappa)) \cdot \exp(\kappa \cdot \cos(\theta - \mu))$, where the scalar $\mu$ is the mean polar angle. The von Mises distribution closely approximates the wrapped normal distribution, and both may be considered rotational analogues of the univariate normal distribution. The von Mises distribution has improved tractability compared with the wrapped normal distribution (which is defined as an infinite series), and therefore using the von Mises kernel may help the perception component 120 perform the computations described hereafter more quickly and at a lower computational cost. Alternatively, kernels with compact support (such as rectangular window, triangle, or parabolic kernels) may be straightforwardly adapted for use as rotational kernels.

Within the meaning of the present disclosure, generating a rotational kernel may include initializing the rotational kernel and determining values for one or more parameters of the rotational kernel, in dependence on one or more hypotheses for the orientation of the object. The one or more parameters may control the peak orientation and optionally the bandwidth and/or amplitude of the rotational kernel. In some cases, the bandwidth and/or amplitude may be set to default values or may otherwise be set to values which are independent of the values of the hypotheses themselves. In some examples, a respective rotational kernel may be generated for each hypothesis. In the example of FIG. 2A, five von Mises kernels are generated with peak orientations corresponding to the five hypotheses for the orientation of the vehicle 104. The solid curves surrounding the axes in FIG. 2A show the angular variation of the densities of the five kernels. In this example, the kernels have a common amplitude (which may be chosen arbitrarily) and a common concentration. In other examples, the amplitudes may be dependent on confidence values associated with the hypotheses. The bandwidth may be set to a default value, or may be set to depend on the total number of hypotheses (narrower kernels are optimal for larger numbers of hypotheses, and it can be shown for a wide range of underlying distributions that for large numbers n of hypotheses the bandwidth should vary in proportion to $n^{-1/5}$ for optimal performance). The value of the bandwidth, or values of one or more constants on which the bandwidth depends, may be calibrated or tuned, for example prior to the deployment of the perception component 120, to provide optimal results on training data consisting of objects for which ground truth orientations are known. Alternatively, the parameters of the kernel may be tuned depending on the data using hyperparameter optimization methods, for example maximum likelihood estimation.

As an alternative to generating a separate rotational kernel for each hypothesis, a rotational kernel may be generated based on several hypotheses. For example, hypotheses may be clustered using a clustering algorithm such as k-means clustering, DBSCAN, OPTICS, or any other suitable method, for example using rotational coordinates or by mapping to a unit circle or sphere and performing clustering in Cartesian coordinates. A separate kernel may then be generated for each cluster, with a mean and bandwidth depending on the mean and standard deviation of the hypotheses, and an amplitude proportional to the number of hypotheses in that cluster. For example, for a cluster containing multiple hypotheses, a von Mises kernel may be generated with a mean value given by the angular mean of the hypotheses, and a bandwidth given by a predetermined function of the standard deviation of the cluster, exploiting the analogy between the von Mises distribution and the univariate normal distribution. The standard deviation may be determined or estimated from the values of the hypotheses, for example as the root mean squared difference from the angular mean or as a predetermined fraction of the angular range, for example half of the angular range. The bandwidth may then correspond to the estimated standard deviation of the cluster, or a predetermined multiple of the standard deviation, with an optional default addend to ensure clusters containing a single hypotheses have a non-zero bandwidth. Values of the predetermined factor and/or the default addend, or other parameters affecting the bandwidth, may be calibrated or tuned prior to deployment or in dependence on the data.

Figure 2B:
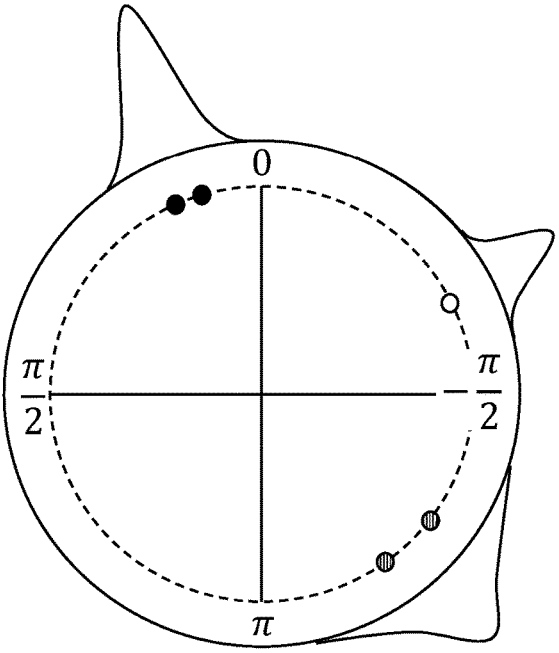

Generating rotational kernels based on clusters can result in a reduced number of kernels being generated, which may lead to computationally more efficient downstream operations. Furthermore, analysing clusters of hypotheses provides a principled method of determining bandwidths for the kernels, though a default value or alternative method may still be needed to deal with clusters containing only a single hypothesis. FIG. 2B shows an example in which three von Mises kernels are generated corresponding to three clusters of hypotheses (indicated respectively by filled, empty, and striped circles). The solid curves surrounding the axes in FIG. 2B show the angular variation of the densities of the three kernels. It is observed that the areas under the kernels corresponding to clusters containing two hypotheses is greater than the area under the kernel corresponding to the cluster containing a single hypothesis. Furthermore, the bandwidths for the clusters containing two hypotheses are greater than the bandwidth for the cluster containing a single hypothesis, with a greater bandwidth for the cluster in which the two hypotheses are more separated from one another.

The perception component 120 includes a probability density estimator 132 configured to estimate values 130 of a rotational probability density function at a set of candidate orientations, based on cumulative contributions from the generated rotational kernels. For a given candidate orientation, each of the generated kernels is evaluated and the results summed to determine the cumulative contribution of the kernels at that candidate orientation. The candidate orientations may be predetermined, for example equally spaced to cover the rotational domain at a desired granularity, or may depend on the determined hypotheses, for example being concentrated around cluster centers for the hypotheses In the example of FIG. 2C, values of a rotational probability density function are estimated at twelve candidate orientations equally spaced at intervals of $\pi/6$ radians or $30°$, based on cumulative contributions from the kernels shown in FIG. 2A or FIG. 2B. The probability density values estimated at the twelve candidate orientations are indicated by the lengths of the line segments emanating from the center of the circle. It is observed that the highest estimated probability density is at an angle of $\pi/6$ radians or $30°$, which is the closest candidate orientation to the actual orientation of the vehicle 104 (0.35 radians or $20°$).

Figure 2C:
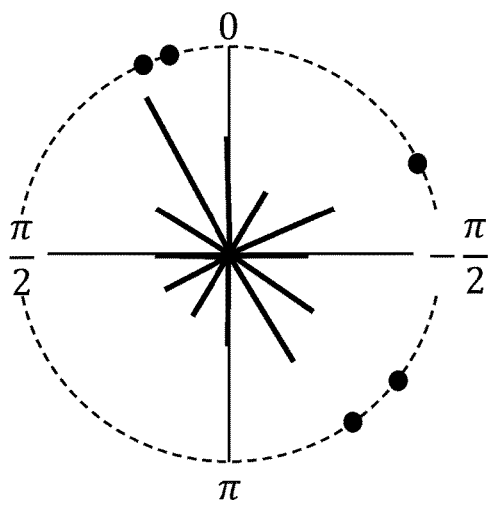

The perception component 120 includes an orientation estimator 134 configured to determine an estimated orientation 136 of the object based at least in part on the probability density values 130 estimated at the candidate orientations. Estimating the orientation of the object may involve determining which candidate orientation has the highest estimated probability density. In examples where the candidate orientations are sufficiently closely spaced (for example every degree or every $0.01\pi$ radians), the determined candidate orientation may be identified as the estimated orientation for the object. In other examples, estimating the orientation of the object may include using the determined candidate orientation as an initial guess and then refining the estimate to determine a more precise estimate for the peak of the probability density function, for example using an iterative mode finding algorithm such as mean shift or gradient ascent until stopping criteria are satisfied (for example, convergence criteria or a predetermined number of iterations having been performed). Mean shift is a non-parametric mode finding algorithm suitable for use with any type of kernel. Gradient ascent is suitable for smooth kernels. In the example of FIG. 2C, the initial guess of $\pi/6$ radians or $30°$ may be refined using either of these methods to arrive at the precise mode of the probability distribution, located at around 0.35 radians or $20°$. By starting the mode finding algorithm at a most probable candidate orientation, the perception component 120 is able to arrive at the correct peak, even in the case of a multimodal rotational probability distribution.

The perception component 120 may be configured to provide the estimated state variables for an object, including the estimated orientation, to a prediction component and a planning component (not shown), which together may determine actions to be performed by a drive system of the vehicle 100. Providing an estimated orientation which is accurate and robust to noise may improve the accuracy with which the prediction component is able to predict the trajectory of the object, enabling the planning component to make better decisions about actions for the drive system to perform. It is to be noted that the perception component 120 is for determining states of objects or entities other than the vehicle 100. The vehicle 100 may further include a localization component, which by contrast is for determining a position and/or orientation of the vehicle 100 itself with respect to a fixed coordinate system.

Figure 3:
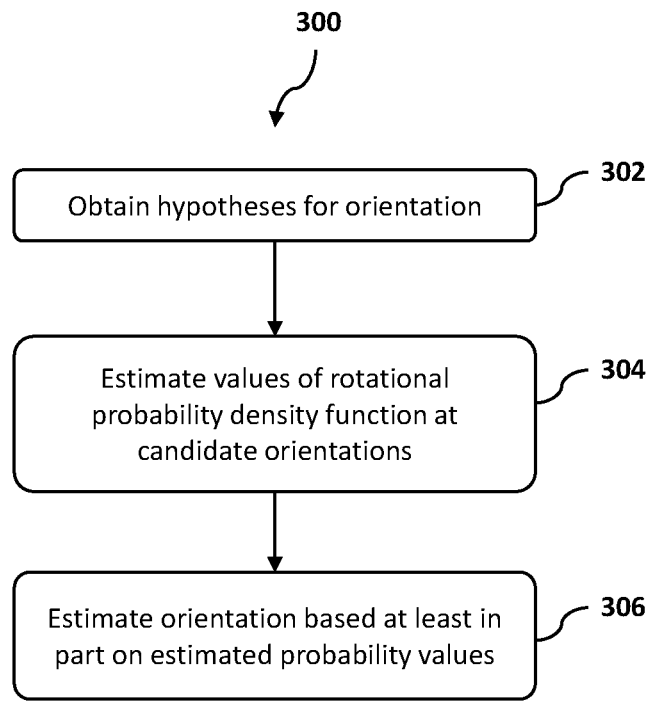
FIG. 3 depicts a flow diagram representing a method of estimating an orientation of an object in a vicinity of a vehicle.

FIG. 3 shows an example of a method 300 of estimating an orientation of an object relative to a coordinate system. The method 300 includes obtaining, at 302, a set of hypotheses for the orientation of the object relative to the coordinate system. Obtaining the hypotheses may for example involve processing sensor data using one or more inference models, such as one or more neural network models and/or other machine learning models. Alternatively, the estimation of the orientation may be performed remotely from the determining of hypotheses, in which case obtaining the hypotheses may involve receiving the hypotheses from a remote system over a data interface. The obtained hypotheses may further include associated confidence values. The method 300 proceeds with estimating, at 304, values of a rotational probability density function at a set of candidate orientations. Estimating the values of the rotational probability density function may involve generating rotational kernels as described above. In other examples, estimating the values of the probability density function may include generating a histogram with rotational bins, and estimating the values of the rotational probability density function based on the number of hypotheses falling within each histogram bin, optionally weighted by confidence values associated with the hypotheses. Other methods of estimating values of a probability density function are known and could similarly be used here. The method 300 concludes with estimating, at 306, the orientation of the object based at least in part on the values of the probability density function estimated at 304. Estimating the orientation may include selecting a candidate orientation having a highest estimated value of the probability density function, and may further involve refining this estimate by executing a mode seeking algorithm starting at the selected candidate orientation, for example an iterative mode seeking algorithm such as mean shift or gradient ascent.

For certain types of objects, such as vehicles, incorrect hypotheses are often observed at particular angles or rotations relative to the ground truth orientation of the object. Such ambiguities manifest as noise in the received set of hypotheses, and due to the high degree of error in such hypotheses, could lead to significant error in the estimated orientation of the object, for example if the estimated orientation is based on an average of the orientation hypotheses. This noise may be caused by approximate symmetries in the geometry of the object. For example, many vehicles have approximate reflective symmetry about a central plane perpendicular to their direction of travel, because certain features of the front of the vehicle may resemble corresponding features at the rear of the vehicle. Both the front and back of the vehicle may for example may include a windshield, a bumper, and an array of lights. Such approximate symmetries may lead to hypotheses for the orientation which are approximately antiparallel to the ground truth orientation. Furthermore, objects may exhibit approximate rotational symmetries. For example, a vehicle or other object with a box-like geometry may have outward facing surfaces in four mutually perpendicular horizontal directions, which may lead to incorrect hypotheses which are perpendicular to the correct orientation, in addition to hypotheses which are antiparallel to the correct orientation. Perpendicular and antiparallel noise are both exhibited in the example of FIG. 1. In cases where the orientation refers to rotations about multiple axes, symmetries may lead to noise at particular rotations and/or reflections of the ground truth orientation.

Figure 4:
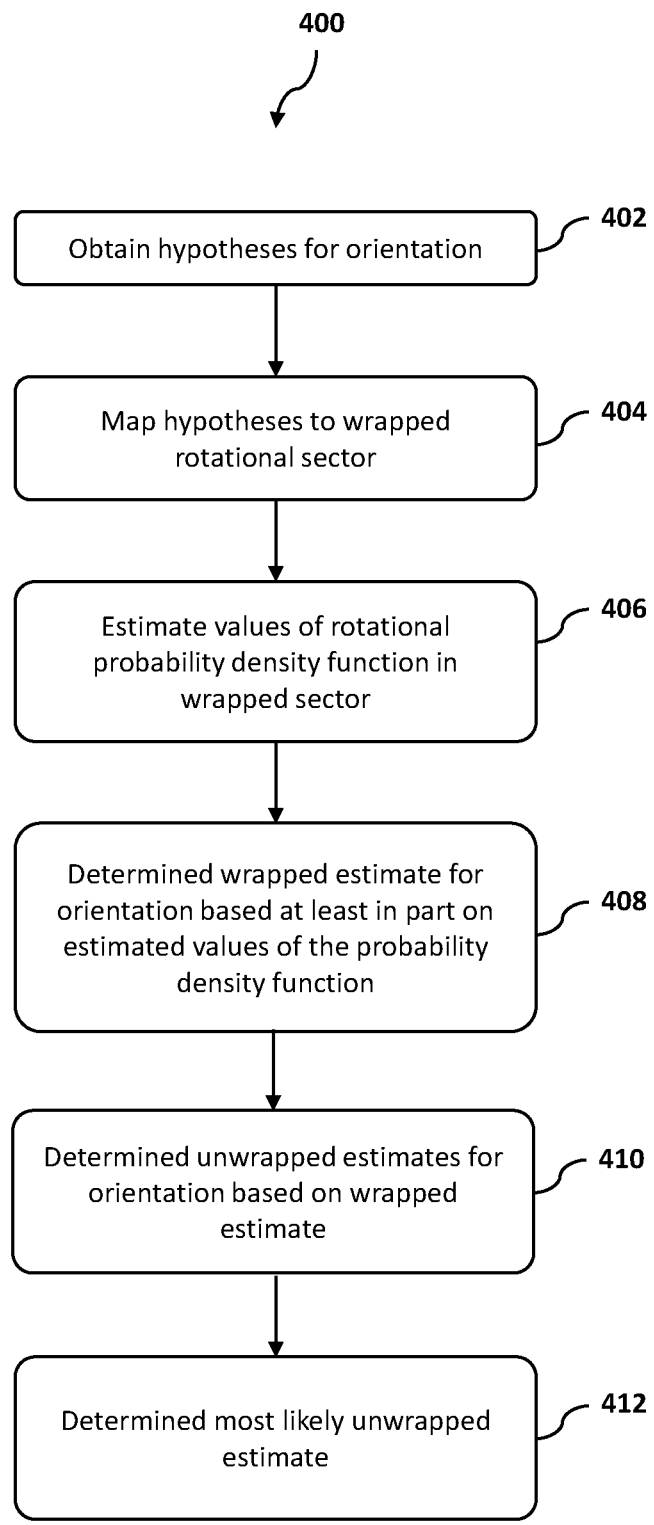
FIG. 4 depicts a flow diagram representing a method of estimating an orientation of an object in the presence of an angular ambiguity.

The method described above mitigates the effects of multimodal noise, because hypotheses which are not close to the principle peak of the rotational probability distribution have little effect on the location of the peak, resulting in such hypotheses effectively being discarded. However, hypotheses close to known rotations of the ground truth orientation may contain useful information about the ground truth orientation, and therefore discarding such hypotheses may also discard useful information carried by such hypotheses. In view of this, FIG. 4 shows a method 400 of estimating an orientation of an object by which information from multimodal noise can be leveraged to achieve improved accuracy. The method 400 begins with obtaining, at 402, hypotheses for an orientation of an object. The received hypotheses may be defined over an entire rotational domain (i.e. covering all possible orientations), and may include some hypotheses corresponding to multimodal noise at particular rotations.

Figure 5A:
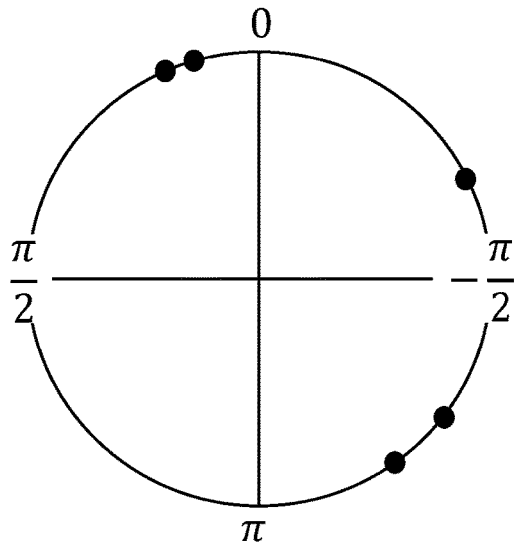
FIGS. 5A-5H illustrate a method of estimating an orientation of an object in the presence of an angular ambiguity.
Figure 5B:
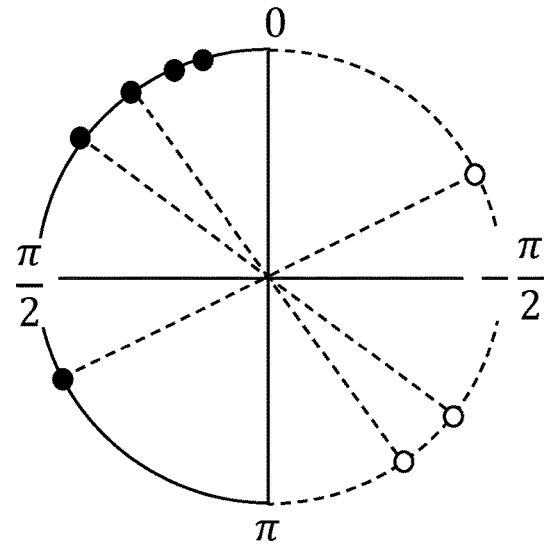
Figure 5C:
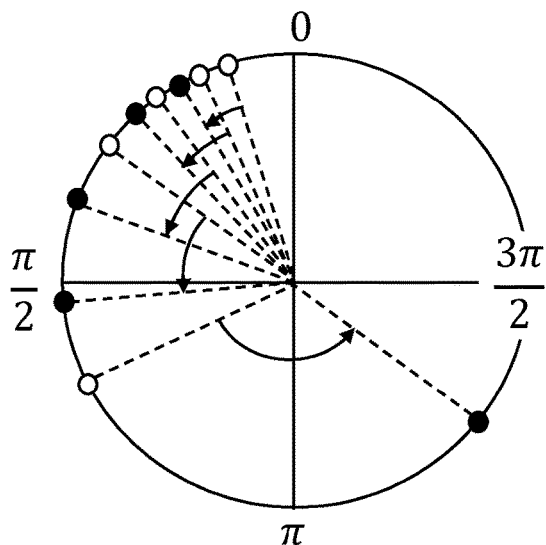
Figure 5D:
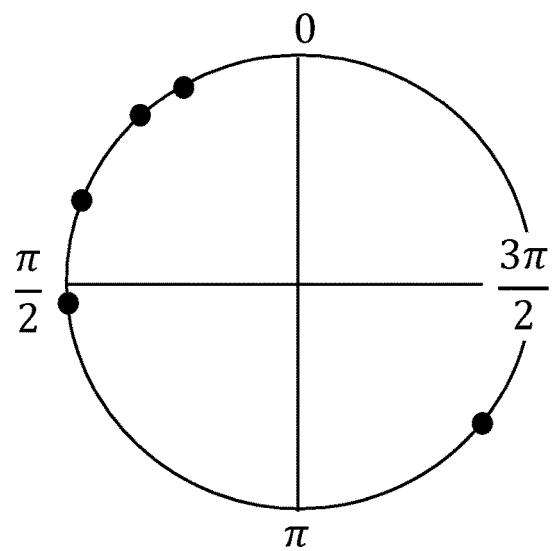

The method 400 proceeds with mapping, at 404, the obtained hypotheses to a wrapped rotational sector. A rotational sector may be a portion of a rotational domain which is bounded with respect to at least one angle so as to exclude part of the rotational domain. For example, in a circular domain $\theta \in (-\pi, \pi]$, the semicircular subdomain $\theta \in [0, \pi)$ and the quarter-circular subdomain $\theta \in [0, \pi/2)$ are examples of rotational sectors. In higher-dimensional rotational domains, a sector may be bounded with respect to a single angle or several angles. For example, in a spherical domain with polar coordinates given by $\{(\theta, \phi): \theta \in [0,\pi], \phi \in (-\pi, \pi]\}$, the hemispherical subdomain $\{(\theta,\phi): \theta \in [0, \pi], \phi \in [0, \pi)\}$, the quarter-spherical subdomain $\{(\theta, \phi): \theta \in [0, \pi/2], \phi \in [0, \pi)\}$, and the quadrant subdomain $\{(\theta, \phi): \theta \in [0, \pi/2], \phi \in [0, \pi/2)\}$, are all examples of rotational sectors. Mapping hypotheses to a wrapped rotational sector may include first mapping the hypotheses to a rotational sector and then performing a wrapping operation to transform the rotational sector to a wrapped rotational sector. Mapping the hypotheses to the rotational sector may include applying rotations (e.g. 90 degree rotations and/or 180 degree rotations about one or more axes) to move any hypothesis falling outside the rotational sector into the rotational sector. FIG. 5A shows the five hypotheses for the orientation of the vehicle 104 of FIG. 1 in the rotational domain $\theta \in (-\pi, \pi]$. FIG. 5B shows as filled circles these five hypotheses mapped to the rotational sector $\theta \in [0, \pi)$. According to this mapping, the three hypotheses falling outside of the rotational sector (shown as empty circles) are rotated through an angle of w radians, whereas hypotheses already falling within the rotational sector are unaffected by the mapping. The wrapping operation may involve stretching or enlarging angles which were bounded to form the rotational sector to cover the full range of angles of the original rotational domain (possibly using a different branch convention). In this way, the wrapped rotational sector may resemble the original rotational domain and exhibit the same continuity as the original rotational domain, though angles within the wrapped rotational sector generally do not correspond to angles within the original rotational domain. FIG. 5C shows a mapping of the five mapped hypotheses (empty circles) within the rotational sector $\theta \in [0, \pi)$, to wrapped hypotheses (filled circles) in the wrapped rotational sector $\theta = [0, 2\pi)$. In this example, the wrapping operation involves doubling the angle $\theta$ for each of the mapped hypotheses. FIG. 5D shows the resulting five wrapped hypotheses.

The choice of rotational sector to which hypotheses are mapped may depend on the expected type of multimodal noise. For example, if incorrect hypotheses are expected due to reflective symmetry, a rotational sector corresponding to half of the rotational domain may be most suitable (for example, a semicircle or hemispherical sector). If incorrect hypotheses are expected at right angle rotations, then a quarter circle or eighth sphere may be most suitable. The choice of wrapped rotational sector may depend on a classification of the object, for example in dependence on the expected symmetries of objects within a particular class (e.g. objects classified as a truck may be more likely to exhibit right angle noise than objects classified as cars or bicycles).

Figure 5E:
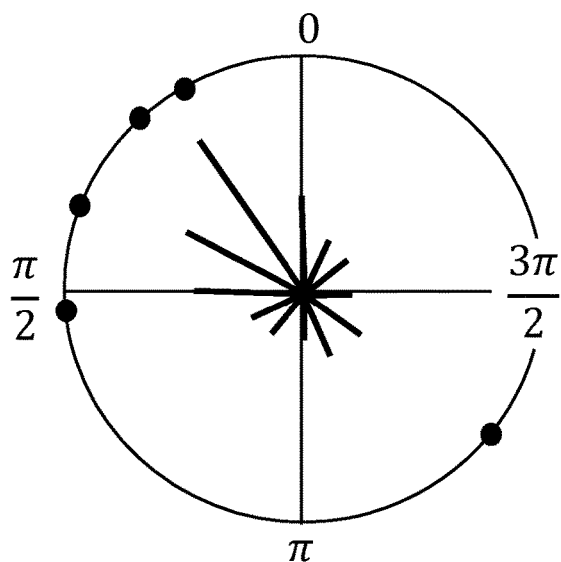

The method 400 continues with estimating, at 406, values of a rotational probability density function at a set of candidate orientations within the wrapped rotational sector. Due to all of the hypotheses being mapped to the same wrapped rotational sector, hypotheses which are close to one another but originate from different rotational sectors can contribute in unison to the estimated values of the probability density function. If the step of mapping hypotheses to a wrapped rotational sector is omitted, such hypotheses may occupy distant regions of the rotational domain and therefore may not combine in this way. FIG. 5E shows estimated values of a rotational probability density function for the orientation of the vehicle 104 in FIG. 1 at twelve candidate orientations in the wrapped rotational sector of FIG. 5D, at equally spaced at intervals of $\pi/6$ radians or 30°. It is observed that the highest estimated value is at an orientation of 30° in the wrapped rotational domain.

The estimating of values of the rotational probability density function at 406 may involve generating a set of rotational kernels within the wrapped rotational sector, with orientations depending on the hypotheses mapped to the wrapped rotational sector, and then estimating the values of the probability density function based on cumulative contributions from the generated kernels. Due to the rotational continuity of the wrapped rotational sector, the same kernels which are applicable in the full rotational domain are applicable in the wrapped rotational sector, and the methods of generating kernels described above remain valid. Alternative methods of estimating the values of the rotational probability density function, for example using histograms, may be used in place of kernel-based methods.

The method 400 proceeds with determining, at 408, a wrapped estimate for the orientation within the wrapped rotational sector, based at least in part of the values of the probability density function estimated at 406. This may for example include selecting the candidate orientation with the highest estimated value, and optionally refining this value for example using recursive methods such as mean shift or gradient ascent. In the example of FIG. 5E, the wrapped estimate may be determined by selecting and optionally refining the candidate orientation of $\pi/6$ radians or 30°. The refined estimate in this example is about 0.7 radians or 40°.

Figure 5F:
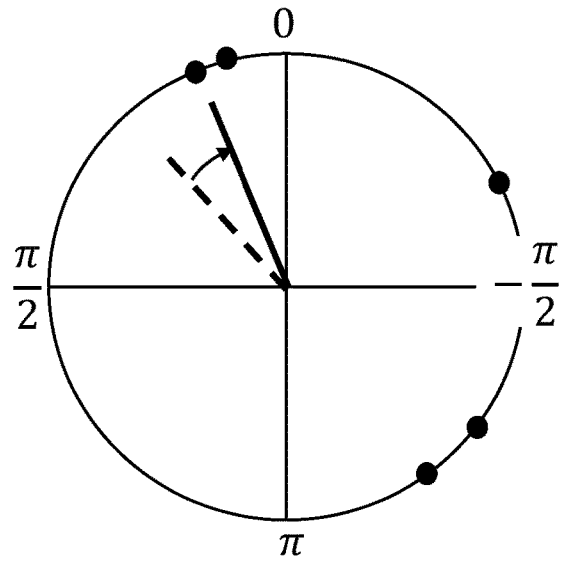
Figure 5G:
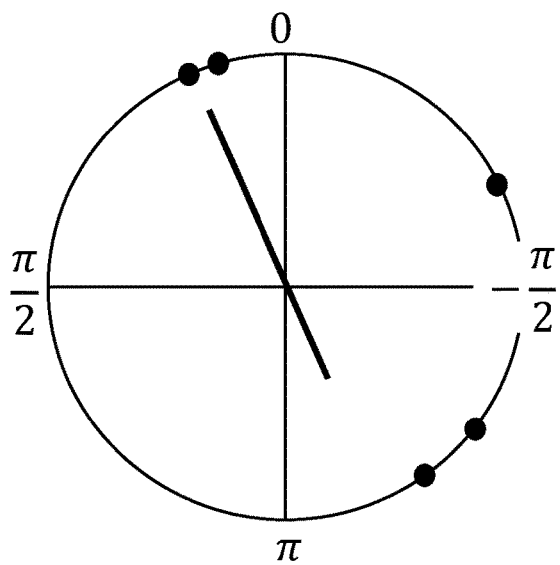

The method 400 continues with determining, at 410, multiple unwrapped estimates for the orientation of the object, based on the determined wrapped estimate. The unwrapped estimates are defined in the original rotational domain, but are derived from the wrapped estimate determined at 408. Determining the unwrapped estimates may include reversing the operations involved in mapping the original hypotheses to the wrapped angular sector. Due to the fact that the mapping to the wrapped rotational sector is a many-to-one mapping, the mapping from the wrapped rotational sector is a one-to-many mapping, resulting in multiple unwrapped hypotheses at fixed rotations relative one another (depending on the choice of rotational sector as discussed above). It is to be noted that a given density of candidate orientations in the wrapped rotational sector corresponds to a higher density of candidate orientations in the original rotational domain, due to the stretching operation in mapping from the full rotational domain to the wrapped rotational domain. FIG. 5F shows an operation in which a first unwrapped estimate (shown as a solid line segment at around 0.35 radians or 20°) is determined by mapping the wrapped estimate of FIG. 5E (shown as a dashed line segment at around 0.7 radians or 40°) from the wrapped rotational sector to the original rotational domain by halving the angle. It is observed that the first unwrapped estimate is close to two of the original hypotheses in the interval [0, $\pi/2$], and of these hypotheses the first wrapped estimate is closer to the hypothesis having the greater angle. This favoring of the hypothesis with the greater angle results from information conferred by two hypotheses in the opposite quadrant. FIG. 5G shows the first unwrapped estimate of FIG. 5E, along with a second unwrapped estimate at around $-2.8$ radians or $-160°$ which is generated by rotating the first unwrapped estimate through $\pi$ radians or 180°. It is observed that the second unwrapped estimate is close to two of the original hypotheses in the interval $(-\pi, -\pi/2]$.

Figure 5H:
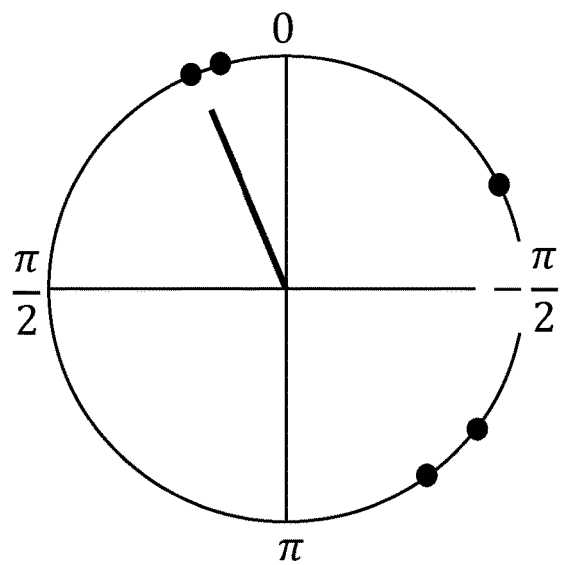

The method 400 concludes with determining, at 412, a most likely of the unwrapped estimates for the orientation of the object, thereby to estimate the orientation of the object. This may involve estimating values of a rotational probability density at each of the unwrapped estimates, for example by generating rotational kernels and determining cumulative contributions of the rotational kernels at each of the unwrapped estimates, or by other means such as a histogram-based method. In the example of FIG. 5G, the lengths of the line segments emanating from the center of the circle represent estimated values of the probability density function. It is observed that the estimated value of the probability density function at around 20° is higher than the estimated value of the probability density function at around $-160°$. The most likely of the unwrapped estimates is therefore the estimate at 20°, which is the final estimate of the orientation as shown in FIG. 5H. Determining the most likely unwrapped estimate has the effect of resolving ambiguities which are inevitably introduced by mapping hypotheses to a wrapped rotational sector.

Figure 6:
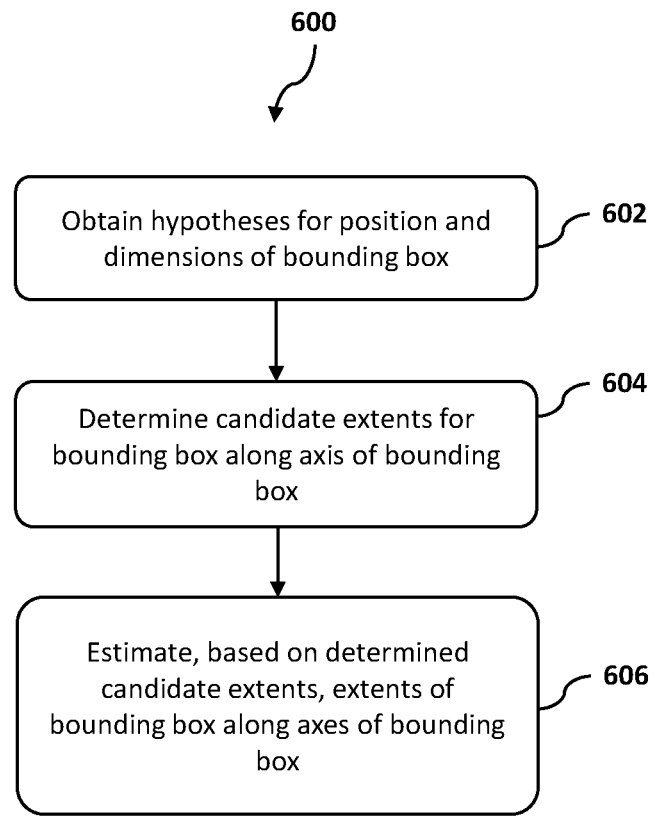
FIG. 6 depicts a flow diagram representing a method of estimating an extent of a bounding box for an object.

The orientation of an object as estimated using the methods described herein may be used to determine more accurate estimates of other state variables for an object, such as the dimensions and position of a bounding box for the object. Dimensions of a bounding box may refer to the length, width, and optionally height of the bounding box. The position of a bounding box may refer to the position of the center of the bounding box relative to a given reference frame (for example, a reference frame of an autonomous vehicle). By accurately estimating the dimensions, position and orientation of bounding boxes for objects in its vicinity, an autonomous vehicle may be able to determine (and predict) regions of space occupied by the objects, which is highly valuable information in the context of autonomous driving. In this regard, a perception component onboard an autonomous vehicle may generate hypotheses for dimensions of a bounding box and for the position and orientation of the bounding box. FIG. 6 shows an example of a method 600 by which an estimated orientation for an object, determined using the methods described above, is leveraged to estimate the position and dimensions of a bounding box for the object, given multiple hypotheses for position and dimensions of the bounding box.

Figure 7A:
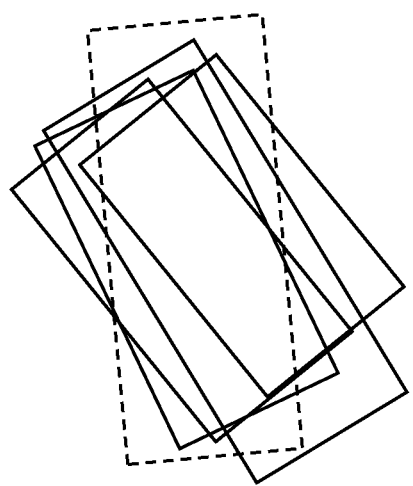
FIGS. 7A-7C illustrate a method of estimating an orientation of an extent of a bounding box for an object.

The method 600 begins with obtaining, at 602, multiple hypotheses for the position and dimensions of the bounding box for the object. Each hypothesis may specify a position and dimensions of the bounding box, and may further specify an orientation for the bounding box. The specified orientations may be processed separately using the methods described above to determine an accurate estimate of the orientation of the object. In examples where each hypothesis specifies an orientation of the bounding box, hypotheses which deviate from the estimated orientation by more than a threshold amount may be discarded. For orientations defined by multiple angles, the threshold may be applied separately to each angle or to a predetermined function such as a norm involving the angles. Alternatively, or additionally, hypotheses may be discarded based on values of an interval over union (IOU) between the bounding boxes. In either case, hypotheses associated with multimodal noise or large errors may be prevented from contaminating the estimate of the dimensions and position of the bounding box. FIG. 7A shows multiple candidate hypotheses for the position, orientation and dimensions of the bounding box for the vehicle 104 of FIG. 1. The orientation of the dashed box deviates from the estimated orientation of the vehicle 104 by more than a threshold amount, and therefore the dashed box may be discarded and excluded from subsequent processing operations.

Figure 7B:
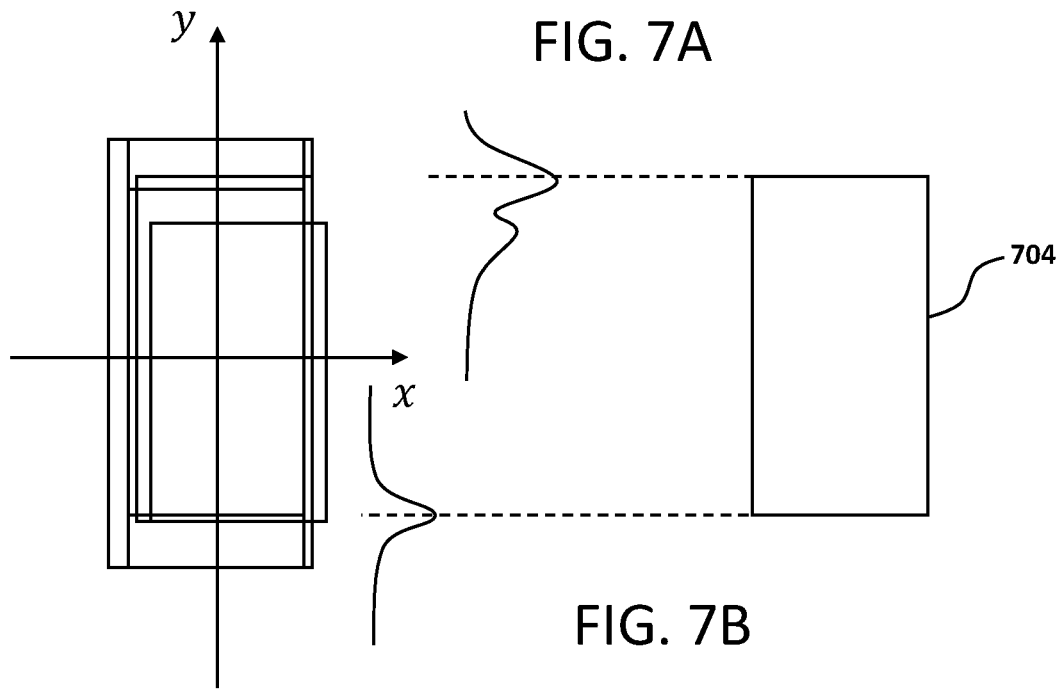

The method 600 proceeds by determining, at 604, candidate extents of the bounding box along axes of the bounding box, based on the estimated orientation of the bounding box and the hypotheses for the position and dimensions of the bounding box. An extent of the bounding box along an axis of the bounding box may refer to a position of a side of the bounding box in a coordinate system aligned with the axis of the bounding box, as defined by the estimated orientation of the bounding box. Accordingly, a rectangular bounding box has two lengthwise extents and two widthwise extents. A cuboid bounding box additionally has two height-wise extents. Determining the candidate extents along the axes of the bounding box may include: (1) for each hypothesis for the bounding box, determining a projected position of the center of the hypothesis in relation to a reference frame oriented in accordance with the estimated orientation of the object, (e.g. by rotating the center of the hypothesis about a fixed point by a rotation corresponding to the inverse of the estimated orientation of the object); and (2) for each hypothesis for the bounding box, offsetting the projected position of the center by half of the hypothesized dimensions along the axes of the bounding box. Alternatively, the candidate extents along the axes of the bounding box may be determined by projecting the positions of the sides of each hypothesized bounding box directly onto a set of axes orientated at the estimated orientation of the object. FIG. 7B shows the bounding boxes hypotheses of FIG. 7A, each projected into a reference frame orientated in accordance with the estimated orientation of the vehicle 104, to illustrate the candidate extents of the bounding box along the axes of the bounding box. The candidate extents are given by the x values of the two y-aligned sides of the rectangles, and the y values of the two x-aligned sides of the rectangles.

The method 600 proceeds with estimating, at 606, extents of the bounding box along the axes of the bounding box, based on the candidate extents determined at 604. Estimating the extents of the bounding box may for example include averaging the candidate extents corresponding to each side of the bounding box. Alternatively, estimating the extents of the bounding box may include estimating a peak value of a probability density function over the candidate extents, for example by generating axial kernels based on the determined candidate extents. An axial kernel may be a univariate kernel defined along an axis of a coordinate system. Each axial kernel may a peak value depending on one or more of the candidate extents. A separate axial kernel may be generated for each candidate extent (in analogy to the method described with reference to FIG. 2A), or axial kernels may correspond to clusters of multiple candidate extents (in analogy to the method described with reference to FIG. 2B).

The peak value of the probability density function may be estimated by executing an iterative mode finding algorithm such as mean shift or gradient ascent starting at a maximum candidate extent for a given side of the bounding box, based on the generated axial kernels. In this context, the maximum candidate extent is the candidate extent with the greatest magnitude, i.e. the candidate extent which is most distant from the estimated position of the center of the object. By starting the mode finding algorithm at the maximum candidate extent, in the case of a multimodal probability density function, the peak which is most distant from the estimated position of the center may be found. This approach favors overestimating, rather than underestimating, the size of the bounding box, which may be preferable for safety reasons. For example, in an autonomous driving context, overestimating the size of an object may cause the autonomous vehicle to leave additional space around the object, whereas underestimating the size could result in the autonomous vehicle not leaving enough space around the object, potentially resulting in a collision. FIG. 7B shows probability density functions for the extent of the bounding box in the positive and negative y directions. The probability density function for the extent in the positive y direction is multimodal. By starting a mode finding algorithm from the candidate extent having the greatest y value, the peak with the greatest y value is found, and the resulting extents of the bounding box along the y axis are indicated by dashed lines. By performing an equivalent operation in the x direction, the extents of an axis-aligned bounding box 704 may be determined.

Once the extents of the axis-aligned bounding box have been estimated, the center and dimensions of the axis-aligned bounding box can be calculated straightforwardly. The axis-aligned bounding box may be transformed back to the original coordinate system to determine the final estimate of the bounding box, for example by rotating the axis-aligned bounding box around the same fixed point by a rotation corresponding to the estimated orientation of the bounding box.

Figure 7C:
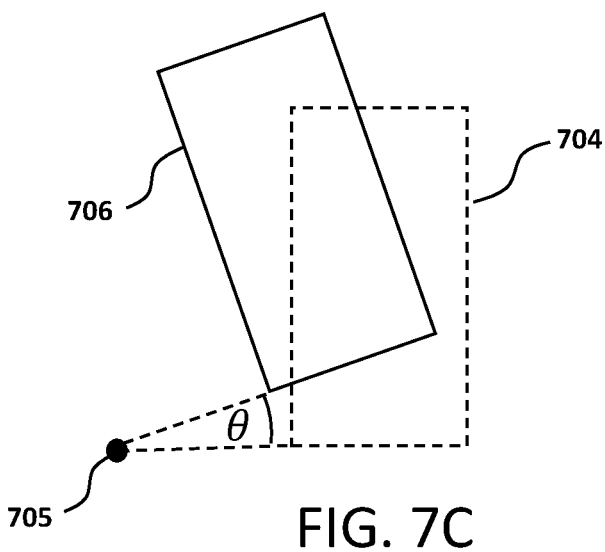

FIG. 7C shows the axis-aligned bounding box 704 being rotated about a fixed point 705 in accordance with the estimated orientation of the vehicle 104, to determine a final estimated bounding box 706 which accurately approximates the ground truth bounding box 106 for the vehicle 104.

When multiple bounding box hypotheses are generated based on sensor data, there may be uncertainty as to which hypotheses corresponds to a given object, particularly when multiple objects are close to one another in an environment. In these cases, bounding boxes associated with a common object may be identified for example based on an IOU between bounding boxes hypotheses, using clustering methods, and/or any other suitable criteria. However, such methods may still result in bounding box hypotheses being incorrectly grouped, which may manifest as highly erroneous hypotheses being introduced for a given object. The methods described herein are inherently robust against such errors, and can furthermore be used to ascertain additional information about objects which are erroneously grouped. In this regard, the method of estimating an orientation of an object can be extended to include estimating orientations for one or more further objects, based on the estimated values of the rotational probability density function. The method may include identifying that the rotational probability density function is multimodal, and estimating an orientation corresponding to each local peak of the rotational probability density function. Determining whether a rotational probability density is multimodal may for example include comparing estimated values of the rotational probability density function at a set of candidate orientations. If the estimated values for multiple candidate orientations are comparable to the highest estimated value (optionally accounting for symmetry-based noise and/or excluding candidate orientations neighboring the most probable candidate orientation), then the rotational probability density function may be identified as multimodal. In this way, even when bounding box hypotheses for multiple objects are erroneously grouped, the present methodology can help to identify that multiple objects are present and provide estimates of the orientation and bounding boxes for the multiple objects. In other examples, bounding box hypotheses may be grouped by identifying peaks in a multimodal rotational probability density function and grouping hypotheses close to each identified peak.

Figure 8:
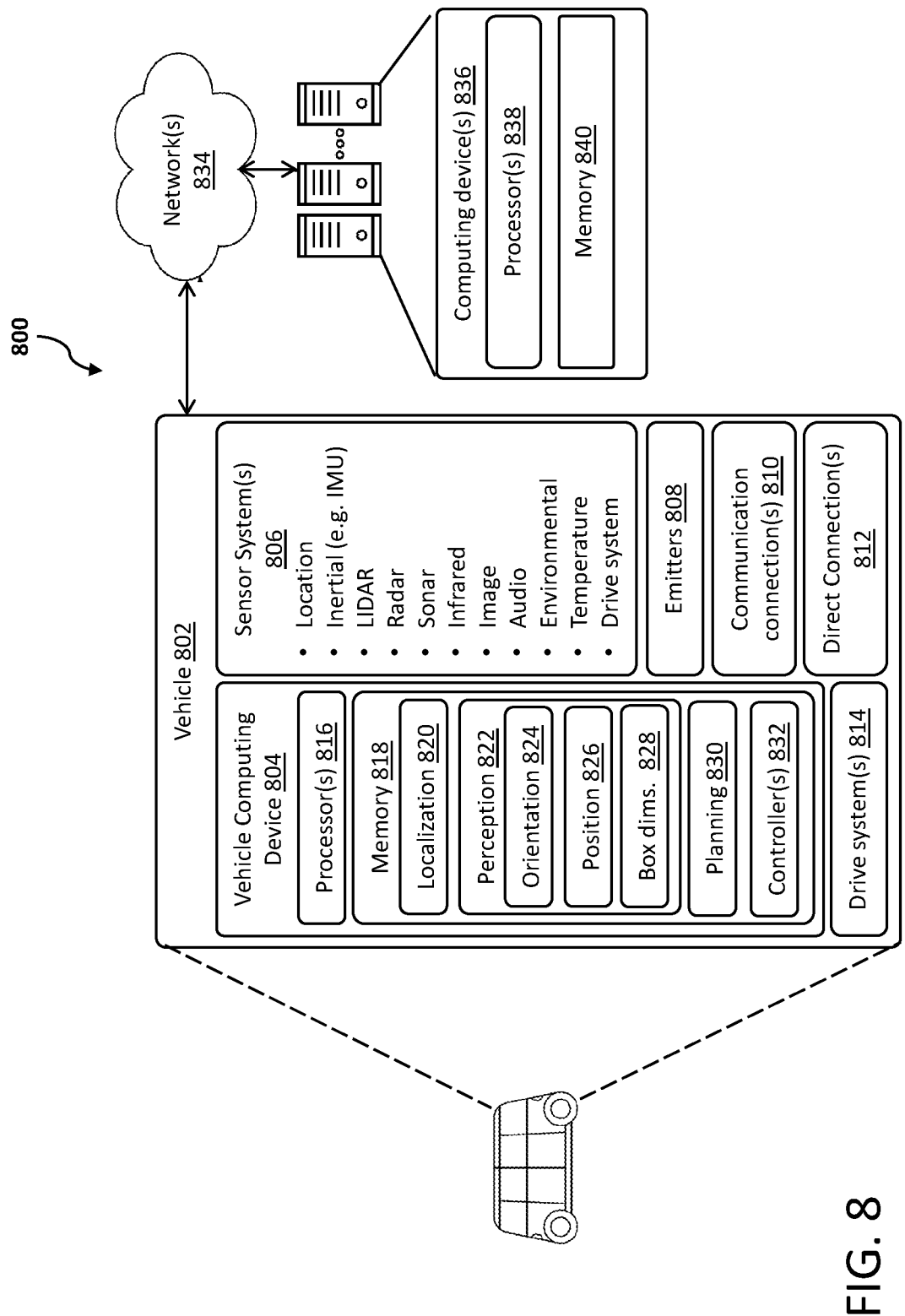
FIG. 8 is a block diagram of an example system for implementing the methods described herein.

FIG. 8 depicts a block diagram of an example system 300 for implementing the techniques described herein. In some instances, the system 800 may include a vehicle 802, which may correspond to the vehicle 100 of FIG. 1. In some instances, the vehicle 802 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 802 may be a fully or partially autonomous vehicle having any other level or classification. Moreover, in some instances, the techniques described herein may be usable by non-autonomous vehicles as well.

The vehicle 802 can include vehicle computing device(s) 804, one or more sensor systems 806, one or more emitters 308, one or more communication connections 810, at least one direct connection 812 (e.g., for physically coupling the vehicle 802 to exchange data and/or to provide power), and one or more drive systems 814.

In some instances, the sensor(s) 806 may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), etc. The sensor(s) 808 may include multiple instances of each of these or other types of sensors. For instance, the LIDAR sensors may include individual LIDAR sensors located at the corners, front, back, sides, and/or top of the vehicle 802. As another example, the cameras may include multiple cameras disposed at various locations about the exterior and/or interior of the vehicle 802. The sensor(s) 306 may provide input to the vehicle computing device(s) 804.

The vehicle 802 may also include the emitter(s) 808 for emitting light and/or sound, as described above. The emitter(s) 808 in this example may include interior audio and visual emitter(s) to communicate with passengers of the vehicle 802. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 808 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 802 may also include the communication connection(s) 810 that enable communication between the vehicle 802 and one or more other local or remote computing device(s). For instance, the communication connection(s) 810 may facilitate communication with other local computing device(s) on the vehicle 802 and/or the drive system(s) 814. Also, the communication connection(s) 808 may additionally or alternatively allow the vehicle 802 to communicate with other nearby computing device(s) (e.g., other nearby vehicles, traffic signals, etc.). The communication connection(s) 810 may additionally or alternatively enable the vehicle 802 to communicate with a computing device 836.

The vehicle computing device(s) 804 can include one or more processors 816 and memory 818 communicatively coupled with the one or more processors 816. In the illustrated example, the memory 818 of the vehicle computing device(s) 804 stores a localization component 820, a perception component 822, one or more system controllers 828, and a planning component 830. Though depicted in FIG. 8 as residing in memory 818 for illustrative purposes, it is contemplated that the localization component 820, the perception component 822, the one or more system controllers 828, and/or the planning component 830 may additionally, or alternatively, be accessible to the vehicle 802 (e.g., stored remotely).

In some instances, the perception component 822 can include functionality to perform object detection, semantic segmentation, instance segmentation, and/or classification. In some examples, the perception component 822 can generate processed sensor data that indicates a presence of an entity that is proximate to the vehicle 802 and/or a classification of the entity as an entity type (e.g., car, pedestrian, cyclist, animal, building, tree, road surface, curb, sidewalk, unknown, etc.). In additional or alternative examples, the perception component 822 can provide processed sensor data that indicates one or more characteristics or state variables associated with a detected entity (e.g., a tracked object) and/or the environment in which the entity is positioned. In some examples, characteristics associated with an entity can include, but are not limited to, an orientation 824, a position 826 (global and/or local position, which can include an x-position, a y-position, and a z-position), and dimensions 828 of a bounding box for the entity. Characteristics may further include an entity type (e.g., a classification), a velocity of the entity, an acceleration of the entity, a geometry of the entity, and so on. Characteristics associated with the environment can include, but are not limited to, a presence of another entity in the environment, a time of day, a day of a week, a season, a weather condition, an indication of darkness/light, etc.

In at least one example, the vehicle computing device(s) 804 can include one or more system controllers 824, which can be configured to control steering, propulsion, braking, safety, emitters, communication, and other systems of the vehicle 802. The system controller(s) 824 can communicate with and/or control corresponding systems of the drive system(s) 814 and/or other components of the vehicle 802.

The system controller(s) 824 may be communicatively coupled to one or more sensors of the vehicle sensor system(s) 806. By way of non-limiting example, the sensors may detect the presence of objects in the environment of the vehicle and/or determine attributes of those objects. The system controller(s) 824 may also cause activation of a safety system of the vehicle 802 when it is determined that the safety system should be activated. For example, the system controller(s) 824 may instruct an airbag control unit to deploy one or more airbags, or may send a signal to a tensioner arranged to adjust tensioning of one or more restraints. Other safety systems are known and may be activated. In other embodiments, the system controller 824 may instruct activation of multiple safety systems. In some embodiments, some or all functionality of the system controller 824 may be performed remote from the vehicle 802, e.g., at a remote server associated with a dispatch or headquarters for the vehicle 802 or in the cloud. In other implementations, some or all of the functionality of the system controller(s) 824 may be performed at the vehicle 802 to minimize any delay that could result from the transmission of data between locales.

The drive system(s) 814 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 814 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 814. Furthermore, the drive system(s) 814 may also include one or more communication connection(s) that enable communication by the respective drive system with one or more other local or remote computing device(s).

In some examples, the vehicle 802 can send operational data, including raw or processed sensor data from the sensor system(s) 806, to one or more computing device(s) 836 via the network(s) 834. In other examples, the vehicle 802 can send processed operational data and/or representations of operational data to the computing device(s) 836 at a particular frequency, after a lapse of a predetermined period of time, in near real-time, etc. In some cases, the vehicle 802 can send raw or processed operational data to the computing device(s) 836 as one or more log files.

The one or more computing device(s) 836 can include one or more processors 838 and memory 840 communicatively coupled with the one or more processors 838. The memory 840 may store data defining an offline model 842 as described elsewhere in the present disclosure. The computing device(s) 836 may also include a user interface 846 for enabling user input relating to assisted labelling functionality as described elsewhere in the present disclosure.

In some instances, aspects of some or all of the components discussed herein may include any models, algorithms, and/or machine learning algorithms. For example, some of the component(s) in the memory 818 may be implemented as a neural network. As can be understood in the context of this disclosure, a neural network may be trained using machine learning in which values of parameters of the network may be determined automatically from data during a training process, rather than being explicitly programmed by a human programmer.

EXAMPLE CLAUSES

A: A system comprising one or more sensors for deployment onboard a vehicle, one or more processors, and one or more computer-readable media storing computer-executable instructions which, when executed by the one or more processors, cause the one or more processors to perform operations comprising: determining, based on data received from the one or more sensors, a plurality of hypotheses for an orientation of an object in a vicinity of the vehicle, relative to a coordinate system of the vehicle; generating a plurality of rotational kernels with orientations depending on the determined plurality of hypotheses; determining, at a plurality of candidate orientations, cumulative contributions from the plurality of rotational kernels; and estimating, based at least in part on the cumulative contributions from the plurality of rotational kernels at the plurality of candidate orientations, the orientation of the object relative to the coordinate system of the vehicle.

B: The system of clause A, wherein the operations comprise processing data from a plurality of sensors using a neural network, thereby to determine the plurality of hypotheses.

C: The system of claim A or B, wherein the operations comprise: mapping the plurality of hypotheses for the orientation of the object to a wrapped rotational sector; determining the plurality of candidate orientations within the wrapped rotational sector; generating the plurality of kernels within the wrapped rotational sector; determining, based on the cumulative contributions of the plurality of kernels within the wrapped rotational sector, a wrapped estimate for the orientation within the wrapped rotational sector; determining a plurality of unwrapped estimates for the orientation based on the determined wrapped estimate for the orientation; and determining a most likely unwrapped estimate of the plurality of unwrapped estimates, thereby to estimate the orientation of the object relative to the coordinate system.

D: The system of any preceding clause, wherein the operations comprise: obtaining a plurality of hypotheses for a position and dimensions of a bounding box for the object; determining, based on the plurality of hypotheses for the position and dimensions of the bounding box and the estimated orientation of the object relative to the coordinate system, candidate extents of the bounding box along an axis of the bounding box; and estimating, based on the determined candidate extents for the bounding box, an extent of the bounding box along the axis of the bounding box.

E: The system of any preceding clause, wherein the operations comprise estimating, based on the cumulative contributions of the plurality of rotational kernels at the plurality of candidate orientations, an orientation of a further object relative to the coordinate system.

F: A computer-implemented method comprising: obtaining a plurality of hypotheses for an orientation of an object in a vicinity of the vehicle, relative to a coordinate system of the vehicle; estimating, based on the plurality of hypotheses, values of a rotational probability density function for the orientation of the object at a plurality of candidate orientations; and estimating, based at least in part on the estimated values of the rotational probability density function at the plurality of candidate orientations, the orientation of the object relative to the coordinate system.

G: The computer-implemented method of clause F, wherein estimating the values of the rotational probability density function comprises: generating a plurality of rotational kernels with peak orientations depending on the determined plurality of hypotheses; and determining, at the plurality of candidate orientations, cumulative likelihood contributions from the plurality of rotational kernels.

H: The computer-implemented method of clause G, wherein the operations comprise: partitioning the plurality of hypotheses into a plurality of angular clusters; and determining, based on a first angular cluster of the plurality of angular clusters, a peak orientation and a width for first rotational kernel of the plurality of rotational kernels.

I: The computer-implemented method of clause G or H, wherein estimating the orientation of the object relative to the coordinate system comprises: identifying a most likely candidate orientation of the plurality of candidate orientations; and executing a mode finding algorithm starting at the most likely candidate orientation, based on the plurality of rotational kernels.

J: The computer-implemented method of any of clauses G to I, wherein the plurality of rotational kernels comprises a wrapped normal kernel and/or Von Mises-Fisher kernel.

K: The computer-implemented method of any of clauses G to J, comprising obtaining respective confidence values for the plurality of hypotheses, wherein the cumulative contributions from the plurality of rotational kernels are weighted in dependence on the respective confidence values.

L: The computer-implemented method of any of clauses F to K, comprising: mapping the plurality of hypotheses for the orientation of the object to a wrapped rotational sector; determining the plurality of candidate orientations within the wrapped rotational sector; estimating the values of the rotational probability density function within the wrapped rotational sector; determining, based at least in part on the values of the rotational probability density function within the wrapped rotational sector, a wrapped estimate for the orientation within the wrapped rotational sector; determining a plurality of unwrapped estimates for the orientation based on the determined wrapped estimate for the orientation; and determining a most likely unwrapped estimate of the plurality of unwrapped estimates, thereby to estimate the orientation of the object relative to the coordinate system.

M: The computer-implemented method of any of clauses F to L, comprising: obtaining a plurality of hypotheses for a position and dimensions of a bounding box for the object; determine, based on the plurality of hypotheses for the position and dimensions of the bounding box and the estimated orientation of the object relative to the coordinate system, candidate extents of the bounding box along an axis of the bounding box; estimating, based on the determined candidate extents for the bounding box, an extent of the bounding box along the axis of the bounding box.

N: The computer-implemented method of clause M, comprising generating, based on the candidate extents of the bounding box, a plurality of axial kernels, wherein estimating the extent of the bounding box comprises performing mean shift or gradient ascent starting at a maximum candidate extent of the plurality of candidate extent, based on the plurality of axial kernels.

O: The computer-implemented method of clause M or N, wherein the plurality of hypotheses for the position and dimensions of the bounding box are associated with the hypotheses for the orientation of the object, the method comprising discarding hypotheses for the position and dimensions for which the associated hypothesis for the orientation deviates from the estimated orientation of the object by more than a threshold amount.

P: The computer-implemented method of any of clauses F to O, comprising estimating, based on the estimated values of the rotational probability density function at the plurality of candidate orientations, an orientation of a further object relative to the coordinate system.

Q: The computer-implemented method of clause P, wherein estimating the orientation of the further object comprises identifying that the rotational probability density function is a multimodal probability distribution.

R: The computer-implemented method of any of clauses F to Q, wherein obtaining the plurality of hypotheses comprises determining the plurality of hypotheses based on data from one or more sensors onboard the vehicle.

S: The computer-implemented method of clause R, wherein determining the plurality of hypotheses comprises processing the data from the one or more sensors using a neural network.

T: One or more non-transitory computer-readable media storing instructions executable by one or more processors, wherein the instructions, when executed, cause the one or more processors to perform operations comprising: obtaining a plurality of hypotheses for an orientation of an object in a vicinity of the vehicle, relative to a coordinate system of the vehicle; estimating, based on the plurality of hypotheses, values of a rotational probability density function for the orientation of the object at a plurality of candidate orientations; and estimating, based at least in part on the estimated values of the rotational probability density function at the plurality of candidate orientations, the orientation of the object relative to the coordinate system.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

What is claimed is:

1. A system comprising:
one or more sensors for deployment onboard a vehicle;
one or more processors; and
one or more computer-readable media storing computer-executable instructions which, when executed by the one or more processors, cause the one or more processors to perform operations comprising:
determining, based on data received from the one or more sensors, a plurality of hypotheses for an orientation of an object in a vicinity of the vehicle, relative to a coordinate system of the vehicle;

generating a plurality of rotational kernels with orientations depending on the determined plurality of hypotheses;

determining, at a plurality of candidate orientations, cumulative contributions from the plurality of rotational kernels; and estimating, based at least in part on the cumulative contributions from the plurality of rotational kernels at the plurality of candidate orientations, the orientation of the object relative to the coordinate system of the vehicle.

2. The system of claim 1, wherein determining the plurality of hypotheses processing the data from the one or more sensors using a neural network.

3. The system of claim 1, wherein the operations further comprise:

mapping the plurality of hypotheses for the orientation of the object to a wrapped rotational sector;

determining the plurality of candidate orientations within the wrapped rotational sector;

generating the plurality of kernels within the wrapped rotational sector;

determining, based on the cumulative contributions of the plurality of kernels within the wrapped rotational sector, a wrapped estimate for the orientation within the wrapped rotational sector;

determining a plurality of unwrapped estimates for the orientation based on the determined wrapped estimate for the orientation; and determining a most likely unwrapped estimate of the plurality of unwrapped estimates, thereby to estimate the orientation of the object relative to the coordinate system.

4. The system of claim 1, wherein the operations further comprise:

obtaining a plurality of hypotheses for a position and dimensions of a bounding box for the object;

determining, based on the plurality of hypotheses for the position and dimensions of the bounding box and the estimated orientation of the object relative to the coordinate system, candidate extents of the bounding box along an axis of the bounding box; and estimating, based on the determined candidate extents of the bounding box, an extent of the bounding box along the axis of the bounding box.

5. The system of claim 1, wherein the operations further comprise estimating, based on the cumulative contributions of the plurality of rotational kernels at the plurality of candidate orientations, an orientation of a further object relative to the coordinate system.

6. A computer-implemented method comprising:

obtaining a plurality of hypotheses for an orientation of an object in a vicinity of a vehicle, relative to a coordinate system of the vehicle;

estimating, based on the plurality of hypotheses, values of a rotational probability density function for the orientation of the object at a plurality of candidate orientations; and estimating, based at least in part on the estimated values of the rotational probability density function at the plurality of candidate orientations, the orientation of the object relative to the coordinate system.

7. The computer-implemented method of claim 6, wherein estimating the values of the rotational probability density function comprises:

generating a plurality of rotational kernels with peak orientations depending on the determined plurality of hypotheses; and determining, at the plurality of candidate orientations, cumulative likelihood contributions from the plurality of rotational kernels.

8. The computer-implemented method of claim 7, further comprising:

partitioning the plurality of hypotheses into a plurality of angular clusters; and determining, based on a first angular cluster of the plurality of angular clusters, a peak orientation and a width for first rotational kernel of the plurality of rotational kernels.

9. The computer-implemented method of claim 7, wherein estimating the orientation of the object relative to the coordinate system comprises:

identifying a most likely candidate orientation of the plurality of candidate orientations; and executing an iterative mode finding algorithm starting at the most likely candidate orientation, based on the plurality of rotational kernels.

10. The computer-implemented method of claim 7, wherein the plurality of rotational kernels comprises a wrapped normal kernel and/or Von Mises-Fisher kernel.

11. The computer-implemented method of claim 7, further comprising obtaining respective confidence values for the plurality of hypotheses, wherein the cumulative contributions from the plurality of rotational kernels are weighted in dependence on the respective confidence values.

12. The computer-implemented method of claim 6, further comprising:

mapping the plurality of hypotheses for the orientation of the object to a wrapped rotational sector;

determining the plurality of candidate orientations within the wrapped rotational sector;

estimating the values of the rotational probability density function within the wrapped rotational sector;

determining, based at least in part on the values of the rotational probability density function within the wrapped rotational sector, a wrapped estimate for the orientation within the wrapped rotational sector;

determining a plurality of unwrapped estimates for the orientation based on the determined wrapped estimate for the orientation; and determining a most likely unwrapped estimate of the plurality of unwrapped estimates, thereby to estimate the orientation of the object relative to the coordinate system.

13. The computer-implemented method of claim 6, further comprising:

obtaining a plurality of hypotheses for a position and dimensions of a bounding box for the object;

determine, based on the plurality of hypotheses for the position and dimensions of the bounding box and the estimated orientation of the object relative to the coordinate system, candidate extents of the bounding box along an axis of the bounding box;

estimating, based on the determined candidate extents of the bounding box, an extent of the bounding box along the axis of the bounding box.

14. The computer-implemented method of claim 13, further comprising generating, based on the candidate extents of the bounding box, a plurality of axial kernels, wherein estimating the extent of the bounding box comprises executing an iterative mode finding algorithm starting at a maximum candidate extent of the plurality of candidate extents, based on the plurality of axial kernels.

15. The computer-implemented method of claim 13, wherein the plurality of hypotheses for the position and dimensions of the bounding box are associated with the hypotheses for the orientation of the object, the method further comprising discarding hypotheses for the position and dimensions for which the associated hypothesis for the orientation deviates from the estimated orientation of the object by more than a threshold amount.

16. The computer-implemented method of claim 6, further comprising estimating, based on the estimated values of the rotational probability density function at the plurality of candidate orientations, an orientation of a further object relative to the coordinate system.

17. The computer-implemented method of claim 16, wherein estimating the orientation of the further object comprises identifying that the rotational probability density function is a multimodal probability distribution.

18. The computer-implemented method of claim 6, wherein obtaining the plurality of hypotheses comprises determining the plurality of hypotheses based on data from one or more sensors onboard the vehicle.

19. The computer-implemented method of claim 18, wherein
determining the plurality of hypotheses comprises processing the data from the one or more sensors using a neural network.

20. One or more non-transitory computer-readable media storing instructions executable by one or more processors, wherein the instructions, when executed, cause the one or more processors to perform operations comprising:
obtaining a plurality of hypotheses for an orientation of an object in a vicinity of a vehicle, relative to a coordinate system of the vehicle;
estimating, based on the plurality of hypotheses, values of a rotational probability density function for the orientation of the object at a plurality of candidate orientations; and
estimating, based at least in part on the estimated values of the rotational probability density function at the plurality of candidate orientations, the orientation of the object relative to the coordinate system.

\* \* \* \* \*